United States Patent

Iida

[15] 3,692,395
[45] Sept. 19, 1972

[54] MOTION PICTURE CAMERA CAPABLE OF AUTOMATIC OVERLAP PHOTOGRAPHING

[72] Inventor: Yozo Iida, Tokyo, Japan
[73] Assignee: Nippon Kogaku K.K., Tokyo, Japan
[22] Filed: Nov. 23, 1971
[21] Appl. No.: 201,588

Related U.S. Application Data

[63] Continuation of Ser. No. 64,256, Aug. 17, 1970, abandoned.

[30] Foreign Application Priority Data

Aug. 18, 1969 Japan......................44/64708

[52] U.S. Cl....................................352/217, 352/91
[51] Int. Cl. .............................................G03b 21/36
[58] Field of Search..................................352/91, 217

[56] References Cited

UNITED STATES PATENTS 3,549,249    12/1970    Katsuyama.................352/217

Primary Examiner—S. Clement Swisher
Attorney—Harry G. Shapiro

[57] ABSTRACT

This invention relates to a motion picture camera which is capable of automatic overlap photographing.

In the present invention, shutter operation or motion for depressing shutter release lever is separated into two steps. In the first step operation, normal photographing is effected, and in the second step operation, the automatic overlap mechanisms are actuated so that shutter blades vary their opening angle from full open to fully closed thereby fade-out photographing is accomplished, and succeedingly said fade-out photographed film is rewound while the shutter opening is kept fully closed. When said rewinding of film completed, the fade-in operation is provided and in this state, by depression of the shutter release lever to its first step, fade-in operation is carried out and after said fade-in photographing was completed, in other words, after the automatic overlap photographing was finished, all mechanisms return to their initial positions. In this way normal photographing can be carried out continuously.

15 Claims, 5 Drawing Figures

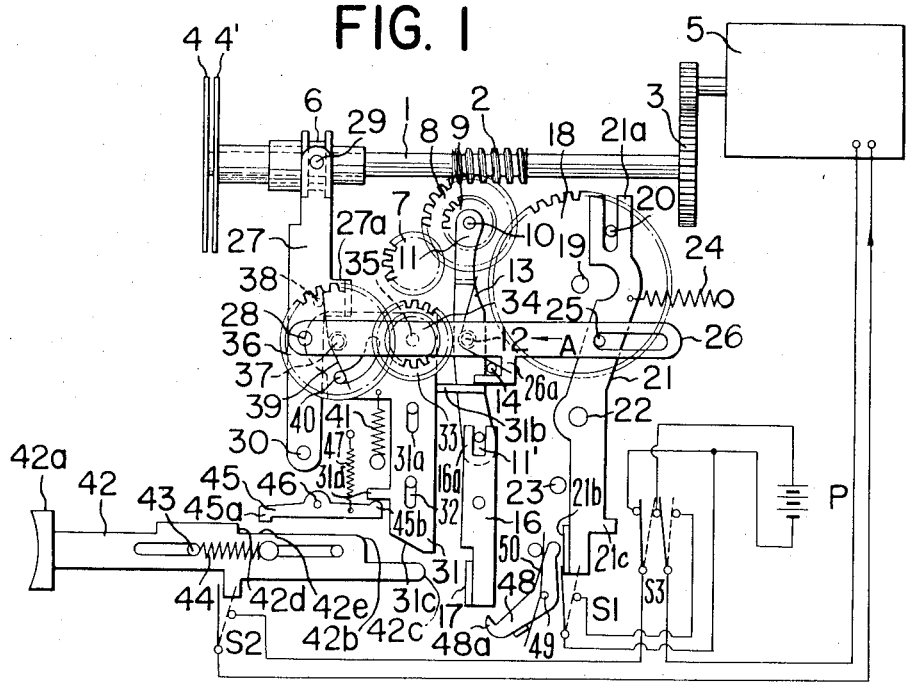

INVENTOR.
YOZO IIDA

BY Harry G. Shapiro

ATTORNEY

ABLE OF
MOTION PICTURE CAMERA CAPABLE OF AUTOMATIC OVERLAP PHOTOGRAPHING

This application is a continuation of my pending application Ser. No. 64,256, now abandoned, filed Aug. 17, 1970.

BACKGROUND OF THE INVENTION

1. Field of the Invention

This invention generally relates to a motion picture camera, and more particularly to a motion picture camera which is capable of automatic overlap photographing.

2. Description of the Prior Art

In the conventional motion picture camera, by operating a member after a fade-out shot, the length of film exposed by the fade-out shot is rewound, and thereafter a fade-in shot is taken for overlap photography. Therefore, in the conventional motion picture camera, it is possible to lose a chance of exposure because of the failure to rewind the film length after the fade-out shot.

SUMMARY OF THE INVENTION

It is an object of the present invention to provide a motion picture camera in which the motor is stopped automatically after completing the rewinding of a film length exposed by a fade-out shot, the rewinding operation being initiated at the same time the fade-out shot is completed or terminated.

According to the present invention, the motion picture camera comprises shutter means consisting of a plurality of shutter blades which are movable in normal and reverse directions. The shutter means are capable of advancing a film when they are moved in normal direction and capable of rewinding the film when moved in reverse direction, thereby providing a variable shutter opening so as to enable fade-out and fade-in operations. The shutter means in driven in normal and reverse directions by an electric prime mover. The camera further comprises a take-up shaft operatively associated with the shutter means to take up the film transported by the shutter means, and a control member driven in normal and reverse directions by the drive force of driving the shutter means so as to cause the shutter blades to move relative to each other to vary the shutter opening angle. A scale member is also provided which is moved in normal and reverse directions by the said driving force to measure the amount of the film subjected to a fade-out shot and the amount of the film to be rewound after said fade-out shot, these amounts of film being equal to each other. The amount of movement of the scale means is substantially equal to the amount of movement of the control member required to nullify the shutter opening. Interlocking means is disposed between the scale member and the control member to transmit to the latter member the movement of the scale member directed to determine the amount of film to be subjected to the fade-out shot as a movement of the control member directed to nullify the shutter opening angle. The interlocking means is arranged not to transmit to the control member any movement directed to rewind the scale member, whereby the interlocking means moves the control member only in the direction to nullify the shutter opening angle during the fade-out operation. First clutch means is provided to connect the shutter means to the take-up shaft or alternatively with the scale member by extraneous change-over operation to thereby transmit the shutter means driving force to one of the take-up shaft and scale member. A fade-in member is driven only in one direction by the shutter means driving force and returned to the original position thereof by a returning member engaging the fade-in member, thereby moving the control member only in the direction to provide a normal shutter opening angle.

Second clutch means connects the shutter means to the fade-in member by extraneous operation to thereby transmit the shutter means driving force to the fade-in member and in response to the movement of the control member when the shutter opening angle is recovered to its normal degree, the second clutch mean releases the connection between the shutter means and the fade-in member. The prime mover is driven by power supply circuits which include a DC power source, a first switch disposed in a circuit for driving the prime mover in reverse direction and when the scale member comes to its terminal position in the direction for determining the amount of film to be rewound, the first switch opens the reverse circuit and when the scale member directed to determine the amount of film to subject to fade-out shot the switch changes to close the reverse circuit, a second switch for opening and closing a circuit for driving the prime mover in normal and reverse directions upon extraneous operation, and a change-over switch which can be changed over between two positions, i.e. the position for driving the prime mover in normal direction and the position for driving the prime mover in reverse direction, in response to the movement of the scale member directed to determine the amount of film subjected to the fade-out shot and in response to the zero opening angle of the shutter means.

BRIEF DESCRIPTION OF THE DRAWINGS

FIG. 1 is a plan view showing the motion picture camera according to an embodiment of the present invention, with the essential parts thereof being in inoperative position.

FIG. 2 is a plan view similar to FIG. 1 but showing the device in a position where a fade-out shot has been completed and the electric circuit is changed over into reverse driving circuit.

DESCRIPTION OF THE PREFERRED EMBODIMENT

Figure 3:
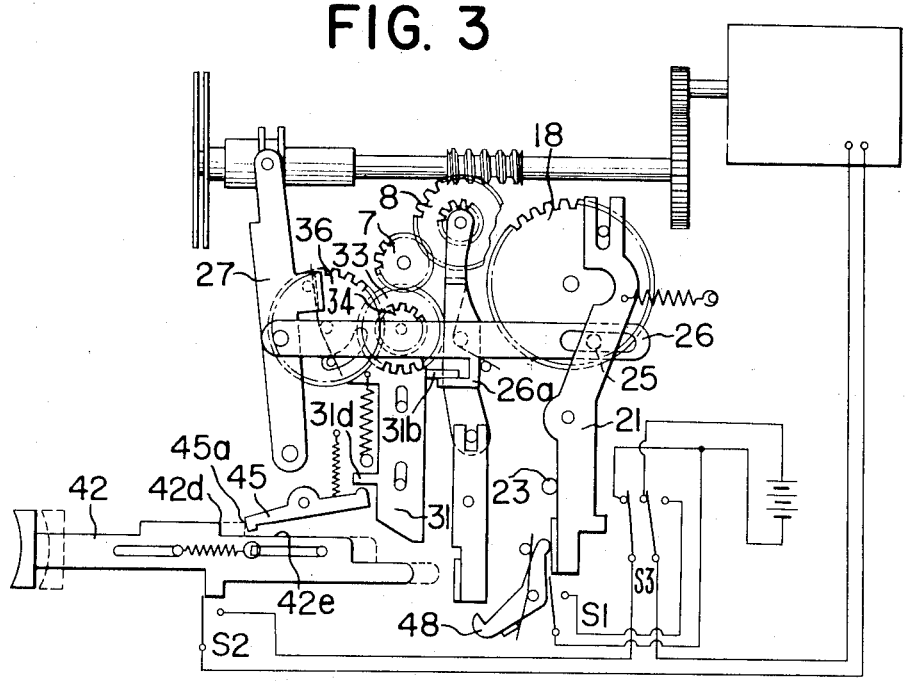
FIG. 3 is a plan view again similar to FIG. 1 but showing the device in a position where the reverse rotation has been completed and just before a fade-in shot is started.

The invention will be described in detail with respect to a preferred embodiment thereof.

Referring to FIG. 1, a shutter shaft 1 has a worm 2 formed integrally therewith. A shutter gear 3 is mounted on the shutter shaft 1 at one end thereof and a pair of known variable opening type shutter blades 4 and 4' are mounted on the shutter shaft 1 at the other end thereof. The shutter shaft 1 is driven from a drive source 5 such as reversible micro-motor through the shutter gear 3 which is in engagement with a gear attached to the drive source. The drive source 5 and accordingly the shutter shaft 1 may be rotated in either direction by means of a circuit change-over switch to be described. A sleeve 6 is mounted on the shutter shaft 1 between the shutter blade 4' and the worm 2 in such a manner that the sleeve 6 is axially moved back and forth by a known means. Upon back and forth movement of the sleeve 6, the two blades 4 and 4' may be rotated in opposite directions to each other to thereby vary their degree of opening. The shutter blades are arranged to be stopped always in a predetermined position by a known means, and they are operatively associated with a known film driving claw means (not shown) which can move a transport of film in either normal or reverse direction in accordance with the direction of rotation of the shutter shaft 1, so that the film can be moved in any of two directions during the shutter operation.

A take-up gear 7 is connected to a film take-up shaft (not shown) by a known means. A worm wheel 8 is always in engagement with the worm 2 and also engageable with the take-up gear 7. A clutch gear 9 formed integrally with the worm wheel 8 is engageable with a scale gear 18 to be described, and it is rotated about a shaft 10 provided on a support arm of a clutch lever 11. The clutch lever 11 is mounted on a shaft 12 studded in a stationary camera body portion (not shown), and held by a torsion spring 13 and a stopper pin 14. The clutch lever 11 is normally urged by the torsion spring 13 so as to maintain the take-up gear 7 and worm wheel 8 in engagement with each other. The clutch lever 11 has a vertically depending end portion 11' having a pin 15 studded therein, which pin is received in a slit 16a formed in an interlocking lever 16. When the lower bent end portion 17 of the interlocking lever 16 is pushed by the muzzle portion 42c of a shutter release lever 42 to be described, the engagement is released between the take-up gear 7 and the worm wheel 8 and the scale gear 18 is brought into engagement with the clutch gear 9. Thus, in case where detent means for preventing the slack of the film is provided on the take-up shaft within the film magazine, the film may be transported in slack condition into a space such as take-up chamber within the magazine and at the same time a shutter opening adjust lever 27 may be actuated through a swinging lever 21 to be described and a connecting rod 26 so as to adjust the shutter opening.

A clutch mechanism is formed by the combination of the worm wheel 8, clutch gear 9, shaft 10, clutch lever 11, shaft 12, torsion spring 13, stopper pin 14, pin 15 and interlocking lever 16.

The aforementioned scale gear 18 is mounted on a shaft 19 for rotation in either direction and has a pin 20 studded in the front face thereof. The pin 20 is received in a slit 21a formed in a swinging lever 21. The swinging lever 21 is pivotally mounted on a shaft 22 studded in the stationary body portion and restrained by a stopper pin 23 and a tension spring 24. The scale gear 18 and swinging lever 21 are normally urged into a reference position. The swinging lever 21 has a projection 21c adapted to actuate a circuit change-over switch S3 which controls the direction of rotation of the micro-motor 5. A pin 25 is studded in the swinging lever 21 for the purpose to be described.

An interlocking mechanism is formed by the combination of the gear 18, shaft 19, pin 20 swinging lever 21, shaft 22, stopper pin 23, tension spring 24 and pin 25.

Figure 5:
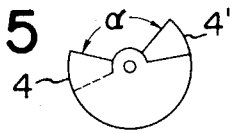
FIG. 5 is a front view showing the variable opening of the shutter blades used with the present invention.

A connecting rod 26 having an inverted L-shaped hook 26a provided intermediately thereof is loosely secured to a shutter blade opening adjust lever 27 by means of a pin 28. The connecting rod 26 is movable only in the direction of the arrow A or in the direction for closing the shutter blade opening, by the displacement of the pin 25 studded in the swinging lever 21, so that the opening angle $\alpha$ of the shutter blades 4 and 4' (FIG. 5) may be continuously varied at a constant rate in accordance with the amount of rotational displacement of the shutter blade opening adjust lever 27 by a known means, as will be described hereunder in greater detail. The amount of rotational displacement of the lever 27 is determined by the amount of rotation of the scale gear 18 through the swinging lever 21 and the connecting rod 26, in such a manner that the shutter opening is zero or fully closed when the scale gear 18 has effected its maximum amount of rotation.

The shutter opening adjust lever 27 is pivotally mounted on a shaft 30 studded in the stationary body portion and fixed as by a friction spring (not shown) against any undesirable movement resulting from vibrations or the like. A pin 29 studded in the lever 27 at the upper end thereof cooperates with the sleeve 6 slidably mounted on the shutter shaft 1, whereby movement of the lever 27 causes the sleeve 6 to axially move so that the shutter opening is greatest in the position of FIG. 1 and the shutter opening is zero or fully closed in the positions of FIGS. 2 and 3 where the shutter opening adjust lever 27 has been rotated counterclockwise to bring the hooked portion 27a thereof into engagement with a mating pin 38 studded in a gear 36, which will be described. The shutter opening adjust lever 27 may be provided with a manually operable dial or like means which can be operated externally of the camera body.

A gear sliding plate 31 formed with elongated slots 31a is arranged so that it is slidably guided in vertical direction through the cooperation between the elongated slots 31a and pins 32 by the protrusion 42b of the shutter release lever 42 to be described, against the force of a tension spring 41. At the upper end portion of the gear sliding plate 31 there is mounted a group of gears 33, 34 and 36, which imparts to the shutter opening adjust lever 27 an amount of displacement equal but opposite in direction which is given to said lever 27 by the rotational displacement of the scale gear 18 via the connecting rod 26. The gear 33 is formed integrally with the gear 34 which is always in engagement with the gear 36, and the gear 33 is loosely mounted on a shaft 35 so as to be engageable with the take-up gear 7. The gear 36 has a mating pin 38 studded therein and is loosely mounted on a shaft 37, so that the gear 36 can resume its initial position by means of a torsion spring 39 and a stopper pin 40 studded in the gear sliding plate 31 when the gear 7 and gear 33 are brought out of engagement. The shutter opening adjust lever 27 is also arranged so that the hooked portion 27a thereof engages the mating pin 38 on the gear 36 when the lever 27 has been rotated counterclockwise. At the right side of the gear sliding plate 31, there is formed a projection 31b for engagement with the hook 26a formed in the connecting rod 26 to maintain the engagement between the gears 7 and 33 while the shutter opening angle is varying or until the reciplocated mortion of the sleeve 6 for varying the opening angle of shutter is completed. At the lower end portion of the gear sliding plate 31 there is provided a sloped surface 31c which is to be engaged by the protrusion 42b of the shutter release lever 42 so as to enable the plate 31 to be vertically moved upon actuation of the release lever 42.

The combination of the hook 26a of the connecting rod 26 and the projection 31b of the gear sliding plate 31 forms a first holding mechanism. The combination of the members the connecting rod 26, shutter opening adjust lever 27, pin 28, pin 29, shaft 30, gear sliding plate 31, pin 32, gears 33, 34, shaft 35, gear 36, shaft 37, mating pin 38, torsion spring 39, stopper pin 40 and 41 tension spring constitutes a shutter opening adjust mechanism.

The shutter release lever 42 is slidably guided in parallel to the shutter shaft 1 by the pin 43 and at the left most position opens a normal driving circuit switch S2 by means of a tension spring 44 to thereby release all the interlocking parts from operative association. The left end portion 42a of the shutter release lever 42 is projected outwardly of the camera body (not shown) so that the shutter release lever 42 is capable of two-step operation from outside the camera body. In the first step of operation, the normal driving circuit switch S2 is closed, and, when the second step of operation is reached, the right end or muzzle portion 42c pushes the lower bend end portion 17 of the lever 16 to thereby force the clutch gear 9 into engagement with the scale gear 18 against the force of the spring 13. Also, the protrusion 42b of the shutter release lever 42 vertically raises the gear sliding plate 31 against the force of the tension spring 41 and, after the engagement is released between the worm wheel 8 and the take-up gear 7, the gear 33 is brought into engagement with the take-up gear 7.

A preventive lever 45 is pivotally mounted on a shaft 46 and urged by a spring 47 so that one end 45b of the lever 45 engages the projection 31d of the gear sliding plate 31 to thereby prevent the second step of operation from occuring in the release lever 42 when the take-up gear 7 is in engagement with the gear 33. This preventive lever 45, together with the shaft 46 and spring 47, forms a preventive mechanism. If the shutter release lever 42 is released from the position of FIG. 2, the preventive lever 45 is urged by the tension spring 47 so that the other end 45a of the lever 45 slightly engages the upper surface 42e of the release lever 42. If the release lever 42 is again actuated, the protrusion 42d thereof will strike the end 45a of the preventive lever 45 so as to prevent the second step of operation of the shutter release lever 42.

A holding lever 48 is pivotally mounted on a shaft 49 and urged by a torsion spring 50. The assembly of the lever 48, shaft 49 and torsion spring 50 constitutes a second holding mechanism.

The holding lever 48 is normally maintained in such a position by the bent portion 21b of the swinging lever 21 so end portion 48a is brought out of engagement with the interlocking lever 16 against the force of the bent portion 21b of the that the lower end portion 48a is brought out of engagement with the interlocking lever 16 against the force of the torsion spring 50. As soon as the interlocking lever 16 is actuated, the swinging lever 21 is swung and thereby the lower end portion 48a of the holding lever 48 retains the interlocking lever 16. Thus, in case where the film magazine is provided with detent means as previously mentioned, any inadvertent release of the shutter release of the shutter release lever 42 will result in no disengagement between the clutch gear 9 and the scale gear 18 until the film carried in slack condition into the space within the take-up chamber is rewound up after the shutter opening is adjusted.

A series of electric circuits are provided by the connections between a power source P such as battery and switches S1 to S3 and micromotor 5. These circuits constitute a drive mechanism. The switch S1 is reverse driving circuit switch provided in the reverse driving circuit and it is open and closed upon the swinging movement of the swinging lever 21 and is kept normally open. The switch S2 is a normal driving circuit switch, and the switch S3 is a normal-reverse driving circuit change-over switch which is directed to change over the direction of rotation of the micromotor 5. As soon as the predetermined rate of film transport and the fade-out operation is completed, the switch S3 is changed over into the reverse driving position by the swinging lever 21 to close the reverse driving circuit (FIG. 2), whereby the amount of the film carried is automatically rewound. The switch S1 is provided in the reverse driving circuit in order to control the amount of the film to be carried and the amount of the film to be rewound so as to be equal to each other. The change-over switch S3 which has assumed the reverse driving position is again changed over into the normal driving position after the normal driving circuit switch S2 is opened upon release of the shutter release lever 42 with the reverse driving circuit switch S1 remaining open.

In operation, the normal photographing is accomplished by effecting the first step of operation, that is, by pushing the shutter release lever 42 until the protrusion 42b thereof strikes the sloped surface 31c of the gear sliding plate 31.

As a result of the first step of operation, the normal driving circuit switch S2 is closed and accordingly the shutter shaft 1 and associated film driving claw (not shown) are driven in the normal direction to thereby enable the normal photographing. To effect the overlap shot, the shutter release lever 42 is further pushed from the above position to carry out the second step of operation (see FIG. 2). As a result of the second step of operation, the muzzle 42c of the release lever 42 strikes the bent end portion 17 of the interlocking lever 16 to swing the interlocking lever 16 and accordingly the clutch lever 11 against the force of the torsion spring 13, whereby the worm wheel 8 is disengaged with the take-up gear 7. On the other hand, the protrusion 42b of the shutter release lever 42 strikes the sloped surface 31c of the gear sliding plate 31 to raise the gear sliding plate 31 upwardly against the force of the tension spring 41 to bring the gear 33 into engagement with the take-up gear 7. In this position no driving force is transmitted to the take-up gear 7 and therefore the group of gears 33, 34 and 36 remains in stationary engagement with one another. Upon the disengagement between the take-up gear 7 and the worm wheel 8, the clutch gear 9 has been brought into engagement with the scale gear 18 to transport a predetermined amount of film into the space within the film magazine or the like and at the same time the connecting rod 26 is moved in the direction of the arrow A in accordance with the amount of rotational displacement of the scale gear 18 by the pin 25 in the swinging lever 21 through the pin 20. As a result, the shutter opening adjust lever 27 is turned counter-clockwise as viewed in FIG. 2 by the pin 28, whereby the opening angle α of the shutter blades is continuously decreased at a constant rate of reduction. There is thus achieved a fade-out effect, with the hooked portion 27a of the shutter opening adjust lever 27 being in engagement with the mating pin 38. On the other hand, the swinging lever 21 is swung by the pin 20 and brought out of engagement with the stopper pin 23, so that the holding lever 48 is turned by the force of the torsion spring 50 thereby maintains the connecting rod 16 by the lower end portion 48a at the position for the second step of operation of the shutter release lever 42.

When the fade-out action is completed, the change-over switch S3 is immediately changed over into the reverse rotation circuit by the projection 21c of the swinging lever 21 and thereby the amount of the film carried is automatically rewound. At this stage the scale gear 18 and swinging lever 21 are only operative and the connecting rod 26 is left unchanged, with a result that the shutter opening remains zero or fully closed. When the amount of the film rewound becomes equal to the amount of film carried, that is, when the swinging lever 21 strikes the stopper pin 23, the reverse rotation circuit switch S1 is opened to stop the micro-motor 5 and accordingly the operation of the entire device. Concurrently therewith, the holding lever 48 is turned by the bent portion 21b of the swinging lever 21 to bring the interlocking lever 16 and holding lever 48 out of engagement. The holding lever 48 is arranged such that even if the release lever 42 is inadvertently released during the aforesaid operation, the interlocking lever 16 is held so as to maintain the engagement between the clutch gear 9 and the scale gear 18 until the rewind operation is finished. This is because in a moving picture camera using a film magazine provided with detent means in the take-up shaft, the amount of film to be stored in the space within the magazine is necessarily limited to a predetermined value and the effort to force an excessive amount of film into that space would lead to an unfavorable result. After all the camera operations have been completed, the shutter release lever 42 is released. Thus, the normal driving circuit switch S2 is opened while the normal-reverse driving circuit change-over switch S3 is changed over into the normal driving circuit. In this position the shutter blades 4 and 4' has zero or fully closed opening and the gear sliding plate 31 has the projection 31b thereof engaged by the inverted L-shaped hook 26a of the connecting rod 26, with a result that the engagement between the gear 33 and the take-up gear 7 is maintained. Moreover, the holding lever 48 is now disengaged with the interlocking lever 16 so as to allow the clutch lever 11 to be turned by the torsion spring 13 and allow the disengagement between the clutch gear 9 and the scale gear 18 but the engagement between the worm gear 8 and the take-up gear 7, whereby there is established a condition for enabling overlap photographing on the once photographed film (see FIG. 3).

Figure 4:
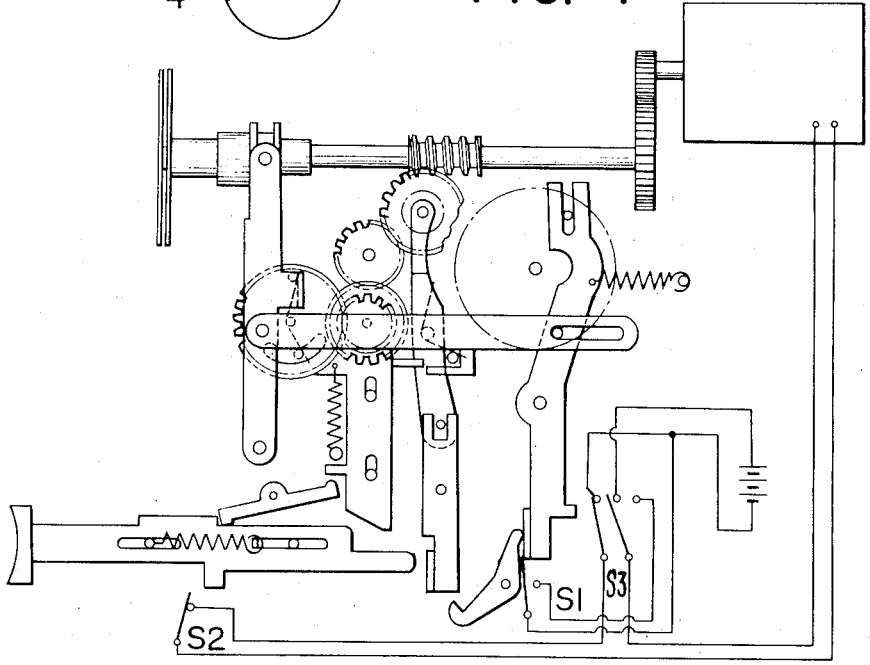
FIG. 4 is a similar plan view but showing the device in a position where the fade-in shot has been completed and just before the position of FIG. 1 is resumed.

Since the projection 31d of the gear sliding plate 31 is in upwardly displaced position, the preventive lever 45 is turned by the spring 47 from a position where the end 45a thereof is in contact with the upper surface of the protrusion 42d of the shutter release lever 42 into a position where that end 45a rests on the surface 42e of the release lever 42, whereby the second step of operation or the fade-out operation may be prevented when the gear sliding plate 31 is in engagement with the take-up gear 7. If the release lever 42 is pushed at this stage, the normal driving circuit switch S2 will be closed to rotate the micro-motor 5 in normal direction to allow the take-up gear 7 to effect its normal operation. At the same time the gear 36 is rotated through gears 33 and 34 to thereby displace the pin 38 on the gear 36 so that the shutter opening adjust lever 27 is rotated clockwise because of the engagement between the bent portion 27a thereof and the pin 38. Thus, the opening angle α of the shutter blades 4 and 4' is continuously varied at a constant rate of increase. In other word, fade-in effect is provided and fade-in shot is effected in overlap relationship on the length of the film which has previously subjected to the fade-out shot. Concurrently the connecting rod 26 is also displaced rightwardly. As soon as the opening angle α of the shutter blades 4 and 4' reaches its full open state, the inverted L-shaped hook 26a of the connecting rod 26 is automatically disengaged from the projection 31b of the gear sliding plate 31 (FIG. 4), so that the gear sliding plate 31 is lowered into its initial position by the tension spring 41. As a result, the engagement is released between the gear 33 and the take-up gear 7 and thereupon the rotational position of the gear 36 is returned to the initial position as shown in FIG. 1 by the torsion spring 39 through the mating pin 38. In this way, normal photographing can be carried out continuously. With the return of the gear sliding plate 31 to its initial position, the projection 31d thereof pushes the end 45b of the preventive lever 45 against the force of the tension spring 47, so that the preventive lever 45 is also returned to its initial position as shown in FIG. 1.

As is apparent from the foregoing disclosure, the present invention can provide an automatic overlap device for a motion picture camera which is very simple to manipulate and ensures overlap photographing to be effected with high reliability.

What is claimed is:

1. A motion picture camera comprising:
   i. shutter means consisting of a plurality of shutter blades movable in normal and reverse directions, said shutter means being capable of advancing a film when they are moved in normal direction and being capable of rewinding said film when they are moved in reverse direction, said shutter blades providing a shutter opening which is variable with relative movement between said shutter blades, said relative movement being separate from a movement of shutter blades which takes place for exposure, thereby enabling fade-out and fade-in shots;

ii. an electric prime mover for driving said shutter means in normal and reverse directions;

iii. a take-up shaft operatively associated with said shutter means to take up the film carried by said shutter means;

iv. a control member driven in normal and reverse directions by the drive force driving said shutter means so as to cause said shutter blades to effect relative movement to vary the shutter opening angle thereof;

v. a scale member moved an amount in normal and reverse directions by said shutter means driving force to measure the amount of the film subjected to a fade-out shot and equal amount of the film to be rewound after said fade-out shot, said amount of movement of said scale member resulting from said shutter means driving force being substantially equal to the amount of movement of said control member required to nullify the shutter opening angle;

vi. interlocking means disposed between said scale member and said control member to transmit to the latter member the movement of said scale member directed to determine the amount of film subjected to the fade-out shot as a movement of said control member directed to nullify the shutter opening angle, said interlocking means being arranged not to transmit to said control member any movement directed to rewind, whereby said interlocking means moves said control member only in the direction to nullify the shutter opening angle during the fade-out shot;

vii. first clutch means for connecting said shutter means to said take-up shaft or alternatively with said scale member upon extraneous change-over operation to thereby transmit the shutter means driving force to one of said take-up shaft and said scale member;

viii. a fade-in member driven only in one direction by said shutter means driving force and returned to the original position thereof by a returning member engaging said fade-in member, to thereby move said control member only in the direction to provide a normal shutter opening angle;

ix. second clutch means for connecting said shutter means to said fade-in member upon extraneous operation to thereby transmit said shutter means driving force to said fade-in member, said second clutch means disconnecting said shutter means from said fade-in member in response to the movement of said control member when the shutter opening angle is recovered to its normal degree; and x. power supply circuits for driving said prime mover and including:
 a. a DC power source,
 b. a first switch disposed in a circuit for driving said prime mover in reverse direction, said first switch assuming a position to open said reversely driving circuit when said scale member comes to its terminal position in the direction for determining the amount of film to be rewound and assuming a position to close said reversely driving circuit when said scale member is moved in the direction for determining the amount of film subjected to fade-out shot,
 c. a second switch for opening and closing a circuit for driving said prime mover in normal and reverse directions upon extraneous operation, and
 d. a change-over switch assuming a position to form a circuit for driving said prime mover in normal direction when said scale member comes to its terminal position for determining the amount of film to be rewound, and in response to the movement of said scale member directed to determine the amount of film subjected to the fade-out shot, said change-over switch being changed over into a position to form a circuit for driving said prime mover in reverse direction when said control member driven by said scale member has nullified the shutter opening angle, and being able to return to said position to form said circuit for driving said prime mover in normal direction only after said second switch is opened.

2. A motion picture camera as defined in claim 1, wherein said control member is arranged to hold said second clutch means until said control member recovers the shutter opening angle to its normal degree after said second clutch means has connected said shutter means to said fade-in member.

3. A motion picture camera as defined in claim 1, wherein said second clutch means is arranged to connect said shutter means to said fade-in member through said take-up shaft.

4. A motion picture camera as defined in claim 1, wherein said fade-in member is arranged to be always in engagement with said second clutch means and displaced upon connection and disconnection of said second clutch means to said shutter means.

5. A motion picture camera as defined in claim 1, wherein said first clutch means, said second clutch means and said second switch are operated by a common member.

6. A motion picture camera as defined in claim 1, wherein said interlocking means comprises a combination of pins and elongated slots.

7. A motion picture camera as defined in claim 1, wherein said control member comprises a plurality of elements movable relative to one another.

8. A motion picture camera as defined in claim 1, wherein said scale member comprises a plurality of elements having different amounts of movement.

9. A motion picture camera as defined in claim 1, further comprising a safety member responsive to the movement of said second clutch means to prevent any malfunction when said second clutch means has connected said shutter means to said fade-in member upon extraneous operation, thereby blocking the effort of said first clutch means to connect said shutter means to said scale member, said safety member being also responsive to the effort of said second clutch means to release the connection between said shutter means and said fade-in member, thereby being returned to its original position.

10. A motion picture camera as defined in claim 1, further comprising a holding member for holding said first clutch means in connected relationship therewith in response to the movement of said scale member directed to determine the amount of film subjected to fade-out shot when said first clutch has connected said shutter means to said scale member upon extraneous operation so as to maintain the connection between said shutter means and said scale member during the fade-out and subsequent rewined operations, said holding member being capable of releasing the engagement with said clutch means in response to the movement of said scale member directed to determin the amount of film to be rewound.

11. A motion picture camera comprising:
i. shutter means having a plurality of shutter blades movable in normal and reverse directions, the shutter means advancing a film when the blades are moved in the normal direction and rewinding the film when moved in the reverse direction, the shutter blades providing an opening which is variable with relative movement between the blades, the relative movement being separate from a movement of the blades which occurs for exposure;
ii. an electric prime mover for driving the shutter means in normal and reverse directions;
iii. means to cause relative movement of the blades to vary the shutter opening;
iv. a reciprocally movable member interconnectable to the shutter means and the shutter opening varying means, the shutter blades being varied from a completely open position to a completely closed position to effect fade-out when the movable member is moved from an original position to a terminal position by movement of the shutter means in the normal direction, and being maintained in the completely closed position when the movable member is returned from the terminal position to the original position by movement of the shutter means in the reverse direction;
v. a normal driving circuit for driving the prime mover in the normal direction;
vi. a reverse driving circuit for driving the prime mover in the reverse direction;
vii. a first switch disposed in the reverse driving circuit, said first switch being opened when the movable member is in the original position, and being closed when the movable member is moved from the original position; and
viii. a change-over switch disposed in the normal and reverse driving circuits having a normal condition for providing the normal driving circuit and a reverse condition for providing the reverse driving circuit, said change-over switch being changed over from the normal condition to the reverse condition to rewind the film subjected to fade-out when the movable member reaches the terminal position, the rewinding of the film being stopped when the movable member is returned to the original position to thereby open the first switch.

12. A motion picture camera as defined in claim 11 wherein the means to cause relative movement of the blades to vary the shutter opening includes an interlocking member interconnectable to the movable member, said interlocking member being arranged to transmit to said means to vary the shutter opening movement of the movable member from the original position to the terminal position and being arranged not to transmit to said means returning movement of the movable member from the terminal position to the original position.

13. A camera as defined in claim 11 further comprising an external accessible member movable from an inoperative position to an extreme position through an intermediate position, a second switch disposed in the normal and reverse driving circuits, the second switch being closed when the accessible member is in the intermediate and extreme positions and being opened when the accessible member is in the inoperative position, the change-over switch being changed over from the reverse condition to the normal condition when the second switch is opened; a rotatable member; first clutch means responsive to movement of the accessible member for connecting the shutter means to the movable member to effect fade-out and subsequent rewinding when the accessible member is in the extreme position, or alternatively with the rotatable member when the accessible member is in the intermediate position; second clutch means responsive to the movement of the accessible member for connecting the rotatable member to the means to cause relative movement of the blades to vary the shutter opening when the accessible member is in the extreme position; and a maintaining member responsive to movement of the opening varying means for maintaining the second clutch means in a position in which said means to vary shutter opening is connected to the rotatable member when such means is moved from a location in which the shutter blades are completely opened, the maintaining member releasing the maintenance of the second clutch when such means reaches a location in which the shutter blades are completely opened, whereby when the rotatable member is connected to both the shutter means and the means to cause relative movement of the blades to vary the shutter opening by the first and second clutch means and the accessible member is in the intermediate position fade-in is effected, and when the maintaining member releases the maintenance of the second clutch means fade-in is completed.

14. A camera as defined in claim 13 wherein the rotatable member is a take-up shaft to take up film carried by the shutter means.

15. A camera as defined in claim 13 further comprising a member for preventing a movement of the accessible member from the intermediate position to the extreme position after the accessible member is moved to the extreme position to thereby effect the fade-out shot and the subsequent rewinding, the member permitting said movement after fade-in is effected.

* * * * *